United States Patent
Vaughan et al.

(10) Patent No.: US 10,245,818 B2
(45) Date of Patent: Apr. 2, 2019

(54) METHOD AND ARRANGEMENT FOR PRE-CURING AN ADHESIVE LAYER

(71) Applicants: Hyundai Motor Company, Seoul (KR); Hyundai Motor Europe Technical Center GmbH, Russelsheim (DE); Kia Motors Corporation, Seoul (KR)

(72) Inventors: Andrew Vaughan, Mainz (DE); Julien Richeton, Main (DE)

(73) Assignees: Hyundai Motor Company, Seoul (KR); Hyundai Motor Europe Technical Center GmbH, Russelsheim (DE); Kia Motors Corporation, Seoul (KR)

(*) Notice: Subject to any disclaimer, the term of this patent is extended or adjusted under 35 U.S.C. 154(b) by 404 days.

(21) Appl. No.: 14/967,330

(22) Filed: Dec. 13, 2015

(65) Prior Publication Data
US 2017/0136755 A1    May 18, 2017

(30) Foreign Application Priority Data
Nov. 13, 2015  (DE) .......................... 10 2015 222 467

(51) Int. Cl.
*B32B 37/12*    (2006.01)
*B32B 7/12*    (2006.01)
(Continued)

(52) U.S. Cl.
CPC .............. *B32B 37/12* (2013.01); *B32B 5/02* (2013.01); *B32B 7/12* (2013.01); *B32B 9/005* (2013.01); *B32B 9/041* (2013.01); *B32B 15/043* (2013.01); *B32B 15/08* (2013.01); *B32B 15/092* (2013.01); *B32B 15/095* (2013.01); *B32B 15/14* (2013.01); *B32B 15/18* (2013.01); *B32B 15/20* (2013.01); *B32B 27/06* (2013.01); *B32B 27/38* (2013.01); *B32B 27/40* (2013.01); *B32B 37/06* (2013.01);
(Continued)

(58) Field of Classification Search
CPC ....................................................... B32B 37/12
See application file for complete search history.

(56) References Cited

U.S. PATENT DOCUMENTS 5,100,494 A    3/1992  Schmidt
5,421,943 A *  6/1995  Tam .................... B23K 20/023
                                                    156/273.9
(Continued)

OTHER PUBLICATIONS

Mas (Thermoset curing through Joule heating of nanocarbons for composite manufacture, repair and soldering, Carbon 63 (2013) 523-529). (Year: 2013).*

(Continued)

*Primary Examiner* — Rachel Kahn
(74) *Attorney, Agent, or Firm* — Mintz Levin Cohn Ferris Glovsky and Popeo, P.C.; Peter F. Corless

(57) ABSTRACT

The invention provides a method for pre-curing an adhesive layer bonding a first component to a second component. The adhesive layer is heated by treating an adhesive layer component as heating the first component with a pair of electrodes that are in electrical contact with a surface of the first component, the pair of electrodes applying a predetermined electrical current ($I_1$, $I_2$) to the first component. The invention further provides an arrangement for pre-curing a layer of adhesive.

12 Claims, 3 Drawing Sheets

(51) Int. Cl.
*B32B 27/38* (2006.01)
*B32B 27/40* (2006.01)
*B32B 37/06* (2006.01)
*B32B 15/092* (2006.01)
*B32B 15/095* (2006.01)
*B32B 5/02* (2006.01)
*B32B 9/00* (2006.01)
*B32B 9/04* (2006.01)
*B32B 15/04* (2006.01)
*B32B 15/08* (2006.01)
*B32B 15/14* (2006.01)
*B32B 15/18* (2006.01)
*B32B 15/20* (2006.01)
*B32B 27/06* (2006.01)

(52) U.S. Cl.
CPC ..... *B32B 2250/02* (2013.01); *B32B 2260/021* (2013.01); *B32B 2260/04* (2013.01); *B32B 2307/202* (2013.01); *B32B 2307/542* (2013.01); *B32B 2309/02* (2013.01); *B32B 2309/04* (2013.01); *B32B 2310/022* (2013.01); *B32B 2363/00* (2013.01); *B32B 2375/00* (2013.01); *B32B 2605/00* (2013.01)

(56) References Cited

U.S. PATENT DOCUMENTS

| | | | | |
|---|---|---|---|---|
| 5,938,956 | A * | 8/1999 | Hembree | H01L 21/50 174/538 |
| 6,146,488 | A | 11/2000 | Okada et al. | |
| 2003/0058076 | A1 * | 3/2003 | Lanoue | H01F 41/127 336/96 |
| 2013/0087278 | A1 * | 4/2013 | Chang | B32B 37/06 156/275.5 |

OTHER PUBLICATIONS

Epotek (B-stage Epoxy, Tech Tip 20, Epoxy Technology Inc, pp. 1-2, 2012; http://www.epotek.com/site/files/Techtips/pdfs/tip20.pdf, accessed Dec. 27, 2017) (Year: 2012).*

Three Bond (Three Bond Technical News, One-Part Epoxy Resin, 19, Issued Oct. 1, 1987; Three Bond Co. Ltd.). (Year: 1987).*

* cited by examiner

METHOD AND ARRANGEMENT FOR PRE-CURING AN ADHESIVE LAYER

CROSS-REFERENCE TO RELATED APPLICATION

This application claims priority to and the benefit of German Patent Application No. 102015222467.8 filed on Nov. 13, 2015, the entire contents of which are incorporated herein by reference.

TECHNICAL FIELD

The present invention relates to a method for pre-curing an adhesive layer bonding a first component to a second component. In addition, the present invention relates to an arrangement for pre-curing an adhesive layer, the adhesive layer bonding a first component to a second component.

BACKGROUND

Lightweight design of structural vehicle components has been more important. For example, hybrid structures of steel and aluminium or composites yield a weight advantage compared to conventional steel structures. However, these secondary materials such as aluminium or composites cannot be joined to steel using resistance spot welding.

In a certain example, U.S. Pat. No. 5,100,494 discloses a process for temporarily joining and then separating two pieces of material. The process comprises steps of furnishing two pieces of material having conformably shaped facing surfaces, bonding the two pieces of material together at a joint, and passing a sufficient electrical current through the resistance element to melt the thermoplastic adhesive, thereby separating the two pieces. The joint includes a layer of thermoplastic adhesive, an electrical resistance element between the two pieces, and means for separating and spacing the electrical resistance element apart from each of the two pieces of material that are bonded together, and the means for separating and spacing apart includes a plurality of non-conductive spacers placed between the electrical resistance element and the pieces of material on each side of the electrical resistance element.

In addition, U.S. Pat. No. 6,146,488 discloses a weld bonding method for bonding metal surfaces together with adhesion both by an adhesive and by resistance spot welding through the adhesive. The process comprises steps of preparing the adhesive by admixing a thermosetting epoxy resin, a latent curing agent and 1 to 15 vol % of one or more conductive additives selected from the group consisting of metal, metal oxide, metal carbide, metal nitride, metal boride and metal silicide; applying the adhesive to at least one of the metal surfaces to be bonded, then spreading the applied adhesive; placing the metal surfaces together with the spread adhesive there between; spot welding the metal surfaces together; and heating the metal surfaces to cure the adhesive whereby the additive improves conductivity to enhance the strength of the spot welds. The additive is in the form of a powder having a particle size of 10 µm or less, or in the form of fragments or flakes having a thickness of at least 0.5 µm and a particle size of 30 µm or less, The usage of an adhesive bonding joining agent can provide an efficient hybrid joint performance. The adhesive needs to be partly cured to allow parts handling. Therefore, a new process is needed to allow pre-curing of adhesive before the main curing process.

SUMMARY OF THE INVENTION

In preferred aspects, the present invention to provide a method and arrangement for pre-curing an adhesive layer capable of allowing pre-curing of adhesive before the main curing process.

In one aspect, the present invention provides a method for pre-curing an adhesive layer that bonds a first component to a second component. The adhesive layer may be heated by heating the first component with a pair of electrodes which is in electrical contact with a surface of the first component. In particular, the pair of electrodes may apply a predetermined electrical current to the first component.

In another aspect, the present invention provides an arrangement for pre-curing an adhesive layer. The arrangement may comprise a bonded structure having a first component bonded to a second component with the adhesive layer, and a device comprising a pair of electrodes that is in electrical contact with a surface of the first component. In particular, the pair of electrodes may apply a predetermined electrical current to the first component in order to heat the adhesive layer by heating the first component.

Particularly, the method for pre-curing the adhesive layer bonding the first component to the second component may use conventional manufacturing machinery in order to pre-cure the adhesive layer such that the bonded structure can be handled without prefixed by fixing means. The method of the present invention can provide a lightweight bonded structure having a high adhesive bonding performance that can be manufactured efficiently and cost-effectively using conventional manufacturing machinery.

In an exemplary embodiment, a method for pre-curing an adhesive layer bonding a first component to a second component comprising: heating the adhesive layer by treating an adhesive layer component. In particular, the pair of electrodes may apply a predetermined electrical current to the first component. The pair of electrode may be, or may not be in electrical contact with a surface of the first component A first electrical current ($I_1$) may be applied to the first component with the pair of electrodes for increase a temperature of the adhesive layer greater than an activation threshold (AT) and thereafter a second electrical current ($I_2$) may be applied to the first component with the pair of electrodes for maintaining the temperature of the adhesive layer in a predetermined temperature range above the activation threshold. Accordingly, the adhesive layer may be pre-cured.

The term "activation threshold (AT)", as used herein, refers to a lowest temperature at which the material or resin included in the adhesive layer may start to crosslink, or alternatively curing of the adhesive layer starts to occur. The activation threshold (AT) may vary based on the cross-linkable polymer material (resin) or curing temperature of the resin composition in the adhesive layer of the present invention.

The predetermined temperature range may be selected for pre-curing the adhesive layer, the predetermined temperature range may be less than a degradation temperature (DT) of the adhesive layer.

The term "degradation temperature" as used herein, refers to a lowest temperature at which thermal degradation, thermal decomposition or irreversible chemical decomposition of the adhesive layer or composition thereof may state to occur.

By maintaining the adhesive layer in the predetermined temperature range greater than the activation threshold and less than the degradation temperature, efficient and safe pre-curing of the adhesive layer can be performed.

The adhesive layer may comprise a one-component epoxy, a two-component epoxy, a one-component polyurethane, a two-component polyurethane or a two-component acrylic. Thus, in accordance with respective requirements a suitable material may be selected that best fits said material requirements.

When the adhesive layer comprises the one-component epoxy, the activation threshold (AT) of the adhesive layer may be about 180° C., the degradation temperature (DT) of the adhesive layer may be greater than about 240° C., and accordingly, the predetermined temperature range (TR) may be of about 180° C. to 240° C.

When the adhesive layer comprises the two-component epoxy, the activation threshold (AT) of the adhesive layer may be of about 120° C., the degradation temperature (DT) of the adhesive layer is greater than about 200° C., and accordingly, the predetermined temperature range (TR) may be of about 120° C. to 200° C.

When the adhesive layer comprises the one-component polyurethane, the activation threshold (AT) of the adhesive layer may be of about 100° C., the degradation temperature (DT) of the layer of adhesive is greater than about 160° C., and accordingly, the predetermined temperature range (TR) is of about 100° C. to 160° C.

When the adhesive layer comprises the two-component polyurethane, the activation threshold (AT) of the adhesive layer may be of about 90° C., the degradation temperature (DT) of the adhesive layer may be greater than about 140° C., and accordingly, the predetermined temperature range (TR) may be of about 90° C. and 140° C.

When the adhesive layer comprises the two-component acrylic, the activation threshold (AT) of the adhesive layer may be of about 60° C., the degradation temperature (DT) of the adhesive layer may be greater than about 120° C., and accordingly, the predetermined temperature range (TR) may be of about 60° C. to 120° C. Thus, efficient pre-curing in the correct temperature range for the adhesive layer may be performed.

The first electrical current may be of about 500 A to 5500 A, or particularly of about 1750 A to 4250 A. In addition, the first electrical current may be applied to the first component for a time duration of about 1000 ms to 7000 ms, or particularly of about 2500 ms to 5500 ms. Further, when applying the first electrical current and the second electrical current, there may be a pause of about 1 ms to 2000 ms, or particularly of about 500 ms to 1500 ms. Thus, the adhesive layer may be rapid heated.

The second electrical current may comprise a predetermined number of pulses of about 250 A to 1450 A, or particularly of about 650 A to 1050 A. The second electrical current may be applied to the first component for a time duration of about 300 ms to 700 ms, or particularly of about 400 ms to 600 ms. By pulsing the second current, the temperature of the adhesive layer may be maintained in the predetermined temperature range at a substantially constant temperature.

After each of the pulses, there may be a pause of about 100 ms to 900 ms, or particularly of about 300 ms to 700 ms. The predetermined number of pulses may be of about 10 to 50 pulses, or particularly of about 20 to 40 pulses. The overall pre-curing time may be therefore preferably short which contributes to an efficient manufacturing process.

A mechanical pressure may be applied to the surface of the first component and a surface of the second component for a predetermined time duration during pre-curing the adhesive layer. By applying the mechanical pressure to the surface of the first component and the surface of the second component bonding of the first component to the second component by means of the adhesive layer may be supported.

The adhesive layer may be formed by a thermosetting adhesive, the first component may comprise a material having an electrical conductivity greater than about 100000 S/m and the second component may comprise one of a fibre reinforced composite, a plastic, a ceramic, aluminium and magnesium. Thus, a lightweight hybrid structure may be manufactured.

In an exemplary embodiment, further provided is an arrangement for pre-curing an adhesive layer. The arrangement may comprise: a bonded structure having a first component bonded to a second component by means of the adhesive layer of; and a device comprising a pair of electrodes that is in electrical contact with a surface of the first component. In particular, the pair of electrodes may apply a predetermined electrical current ($I_1$, $I_2$) to an adhesive layer component in order to heat the adhesive layer.

The pair of electrodes may to apply a first electrical current ($I_1$) to the first component for raising the temperature of the adhesive layer above an activation threshold (AT) and thereafter to apply a second electrical current ($I_2$) to the first component for holding the temperature of the adhesive layer in a predetermined temperature range (TR) above the activation threshold (AT). Further, the predetermined temperature range (TR) may be less than a degradation temperature (DT) of the adhesive layer.

The device may further comprise a means for applying a mechanical pressure (P) to the surface of the first component and a surface of the second component for a predetermined time duration (t3) during pre-curing the adhesive layer.

The adhesive layer may comprise by a thermosetting adhesive, the first component may comprise a material having an electrical conductivity greater than about 100000 S/m and the second component may comprise at least one of a fibre reinforced composite, a plastic, a ceramic, aluminium and magnesium.

As discussed the meant methods preferably function as pre-curing of an adhesive layer. As such, preferably, no more than about 95, 90, 85, 80, 70, 60, 50, 40, 30, 20 or 10 weight percent (wt %) of the adhesive layer component(s) that can react in presence of electrodes as disclosed herein will react (e.g. react by covalent bonding forming reaction or otherwise increase molecular weight).

In preferred aspects, after a pre-curing treatment as disclosed herein, an adhesive layer may be further treated (i.e. cured). Such further treatment may be considered as a main curing treatment or otherwise a subsequent curing. For example, after a pre-curing treatment as disclosed herein, an adhesive layer may be further cured by thermal treatment with a radiant heat source (e.g. UV radiation), by additional electrical current treatment. A preferred subsequent or main curing includes thermal curing and UV light curing.

Further provided is a vehicle part that comprises the adhesive layer as described herein.

Still further provided is a vehicle that comprises the vehicle part comprising the adhesive layer as described herein.

The described embodiments and further developments are combinable with each other in any desired manner.

Further possible embodiments, developments and implementations of the invention also comprise combinations of features described above or in the following with reference to the embodiments of the invention.

BRIEF DESCRIPTION OF THE DRAWINGS

The enclosed figures are to convey a further understanding of the embodiments of the invention. They illustrate embodiments and serve in connection with the description to explain principles and concepts of the invention.

Other embodiments and many of the stated advantages are evident with respect to the figures. The illustrated elements of the figures are not necessarily shown to scale with respect to each other.

Unless indicated otherwise, like reference numbers throughout the figures indicate like elements.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1A:
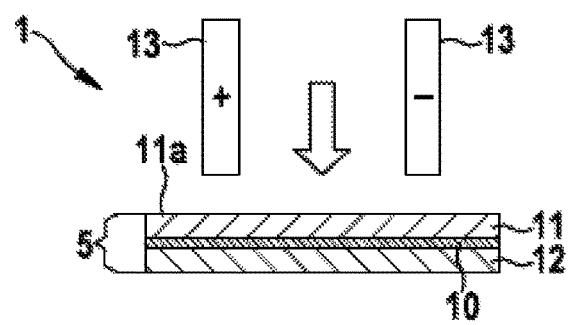
FIG. 1A illustrates an exemplary arrangement for pre-curing an exemplary adhesive layer according to an exemplary embodiment of the invention.

FIG. 1A illustrates an exemplary arrangement for pre-curing an exemplary adhesive layer according to an exemplary embodiment of the invention.

The arrangement 1 may comprise a bonded structure 5 having a first component 11 bonded to a second component 12 by means of the adhesive layer 10. A device (not shown in FIG. 1A) may comprise a pair of electrodes 13 that is in electrical contact with a surface 11a of the first component 11.

Figure 1B:
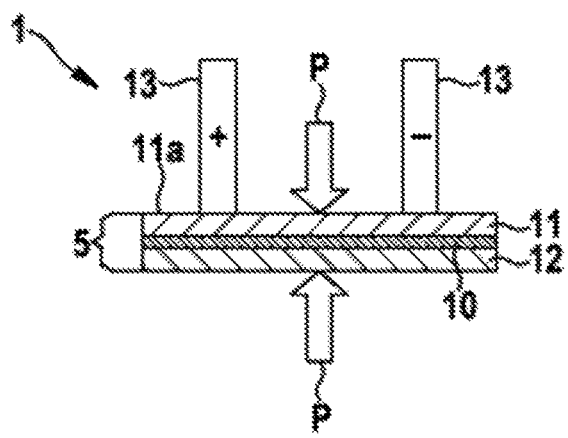
FIG. 1B illustrates an exemplary arrangement for pre-curing an exemplary adhesive layer according to an exemplary embodiment of the invention.

FIG. 1B illustrates another exemplary arrangement for pre-curing the adhesive layer according to an exemplary embodiment of the invention.

As being in electrical contact with the surface 11a of the first component 11, the pair of electrodes may apply a predetermined electrical current to the first component 11 in order to heat the adhesive layer 10 by treating the adhesive layer component as heating the first component 11.

Furthermore, the device further comprises a unit for applying a mechanical pressure P to the surface 11a of the first component 11 and a surface 12a of the second component 12 for a predetermined time duration during pre-curing the adhesive layer 10.

Figure 1C:
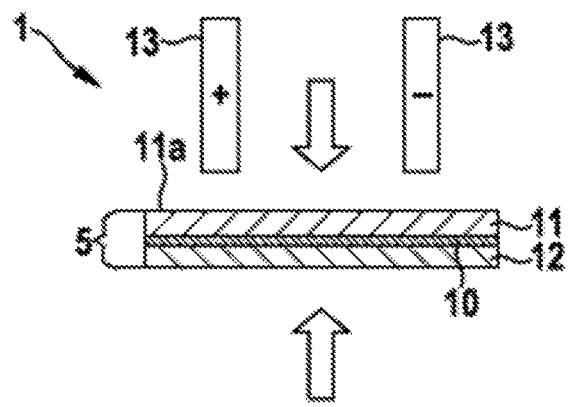
FIG. 1C illustrates an exemplary arrangement for pre-curing an exemplary adhesive layer according to an exemplary embodiment of the invention.

FIG. 1C illustrates an exemplary arrangement for pre-curing the adhesive layer according to an exemplary embodiment of the invention.

After pre-curing of the adhesive layer is completed, a mechanical pressure P may be applied to the surface 11a of the first component 11 and a surface 12a of the second component 12 is released and the pair of electrodes 13 may be retracted from the surface 11a of the first component 11.

Figure 2:
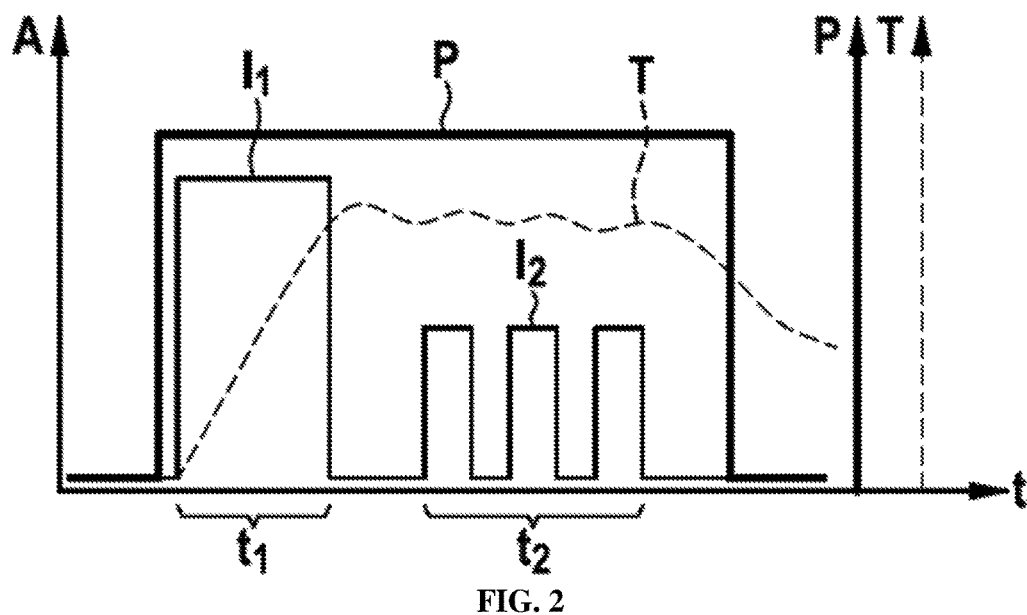
FIG. 2 is a graph of an electrical current, a pressure and a temperature against time of an exemplary pre-curing method according to an exemplary embodiment of the invention.

FIG. 2 is a graph of an electrical current, a pressure and a temperature against time of an exemplary pre-curing method according to an exemplary embodiment of the invention.

A first electrical current $I_1$ may be applied to the first component by means of the pair of electrodes for raising the temperature T of the adhesive layer above an activation threshold $\Delta T$.

The adhesive layer may preferably comprise a one-component epoxy. Alternatively, the adhesive layer may comprise a two-component epoxy, a one-component polyurethane, a two-component polyurethane or a two-component acrylic.

The activation threshold of the adhesive layer may be about 180° C. for the one-component epoxy. Alternatively, the activation threshold of the adhesive layer may be 120° C. for the two-component epoxy, 100° C. for one-component polyurethane, 90° C. the two-component polyurethane and 60° C. for the two-component acrylic.

Thereafter, a second electrical current $I_2$ may be applied to the first component by means of the pair of electrodes for holding the temperature T of the adhesive layer in a predetermined temperature range above the activation threshold. The predetermined temperature range selected for pre-curing the adhesive layer may be of about 180° C. to 240° C. for the one-component epoxy. A recommended curing temperature range may be of about 150° C. to 210° C. for the one-component epoxy.

Alternatively, the predetermined temperature range selected for pre-curing the adhesive layer may be of about 120° C. to 200° C. for the two-component epoxy. A recommended curing temperature range may be of about 25° C. to 180° C. for the two-component epoxy.

Alternatively, the predetermined temperature range selected for pre-curing the adhesive layer may be of about 100° C. to 160° C. for the one-component polyurethane. A recommended curing temperature range may be of about 70° C. to 130° C. for the one-component polyurethane.

Alternatively, the predetermined temperature range selected for pre-curing the adhesive layer may be of about 90° C. to 140° C. for the two-component polyurethane. A recommended curing temperature range may be of about 25° C. to 130° C. for the two-component polyurethane.

Alternatively, the predetermined temperature range selected for pre-curing the adhesive layer may be of about 60° C. to 120° C. for the two-component acrylic. A recommended curing temperature range may be of about 25° C. to 80° C. for the two-component acrylic.

The first electrical current $I_1$ may be of about 3000 A. Alternatively, the first electrical current $I_1$ may be in a range of about 500 A to 5500 A, or particularly of about 1750 A to 4250 A.

The first electrical current $I_1$ may be applied to the first component for a time duration of about 4000 ms. Alternatively, the first current $I_1$ may be applied to the first component within a time range of about 1000 ms to 7000 ms, or particularly of about 2500 ms to 5500 ms.

The second electrical current $I_2$ may comprise a predetermined number of pulses of about 850 A. Alternatively, the predetermined number of pulses of the second electrical current $I_2$ may be within a range of about 250 A to 1450 A, or particularly of about 650 A and 1050 A. The predetermined number of pulses may be applied to the first component for a time duration of about 500 ms. Alternatively, the predetermined number of pulses of the second electrical current $I_2$ may be applied to the first component within a time range of about 300 ms to 700 ms, or particularly of about 400 ms to 600 ms.

After each of the pulses, there may be a pause of about 500 ms. Alternatively, after each of the pulses the pause may be within the range of about 100 ms to 900 ms, or particularly of about 300 ms to 700 ms.

The predetermined number of pulses may be of about 30 pulses. Alternatively, the predetermined number of pulses may be within a range of about 10 to 50 pulses, or particularly of about 20 to 40 pulses.

The total time duration, during which the first component and consequently the adhesive layer are heated to above the activation threshold and are held within the predetermined temperature range, may be greater than about 30 s.

Before the first electrical current is applied by the pair of electrodes to the first component, the mechanical pressure P may be applied to the surface of the first component and the surface of the second component for the predetermined time duration during pre-curing the adhesive layer.

Furthermore, as shown in FIG. 2, the temperature of the adhesive layer usually may rise at a substantially constant rate during application of the first electrical current $I_1$ and may be subsequently held at a substantially constant level during application of the second electrical current $I_2$. When the application of the second electrical current $I_2$ ends, the temperature T of the adhesive layer may begin to fall.

Figure 3:
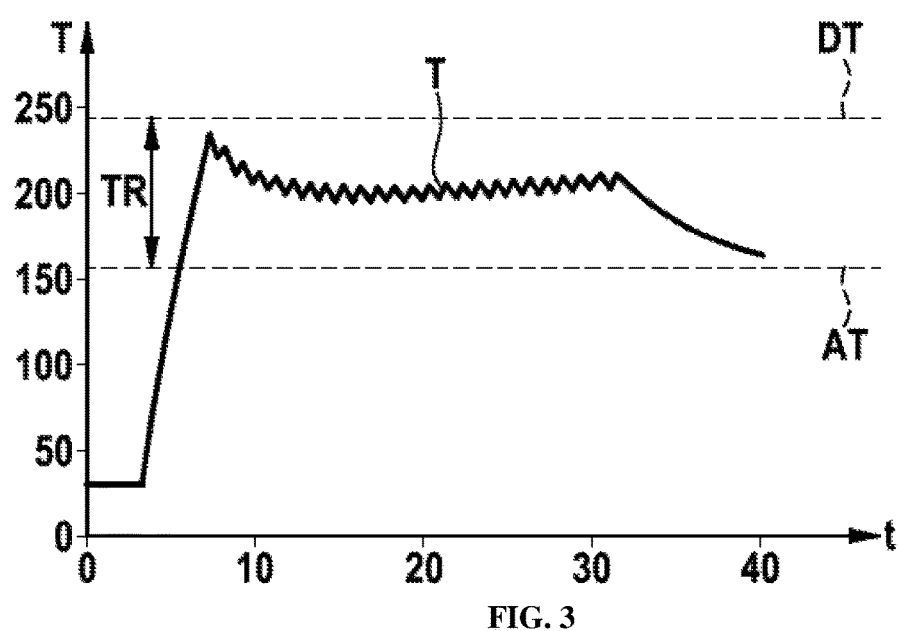
FIG. 3 is a graph of temperature against time of heating an exemplary adhesive layer according to an exemplary embodiment of the invention.

FIG. 3 is a graph of temperature against time of heating the adhesive layer according to an exemplary embodiment of the invention.

The predetermined temperature range TR may be selected for pre-curing the adhesive layer. The predetermined temperature range TR may be greater than the activation threshold AT and less than a degradation temperature DT of the adhesive layer. As indicated in FIG. 3, the activation threshold of the adhesive layer may be 180° C. for the one-component epoxy. Alternatively, depending on a choice of adhesive, the activation threshold and/or the degradation temperature and consequently the predetermined temperature range may be different.

The degradation temperature DT of the adhesive layer may be greater than about 240° C. for the one-component epoxy. Alternatively, the degradation temperature DT of the adhesive layer may be greater than about 200° C. for the two-component epoxy, greater than about 160° C. for one-component polyurethane, greater than about 140° C. the two-component polyurethane and greater than about 120° C. for the two-component acrylic.

Initially, the temperature of the adhesive layer may increase greater than the activation threshold, for example, in about 3 to 5 s. Thereafter, the temperature of the adhesive layer may be maintained at a substantially constant temperature within the predetermined temperature range TR for a time duration of about 30 s. Upon completing the heating of the adhesive layer, the temperature may begin to fall.

The arrangement for pre-curing an adhesive layer may have a lap shear strength of greater than about 1.0 MPa for a pre-curing time of about 40 seconds.

The adhesive layer may comprise a thermosetting adhesive. However, any material generally used in the related arts may be suitably used. For example, the first component may comprise steel. Alternatively, the first component may comprise aluminium or magnesium. Further, the first component may comprise any material having an electrical conductivity greater than about 100000 S/m.

The second component may comprise a fibre reinforced composite. Alternatively, the second component may comprise one of a plastic, a ceramic, aluminium, magnesium.

Figure 4:
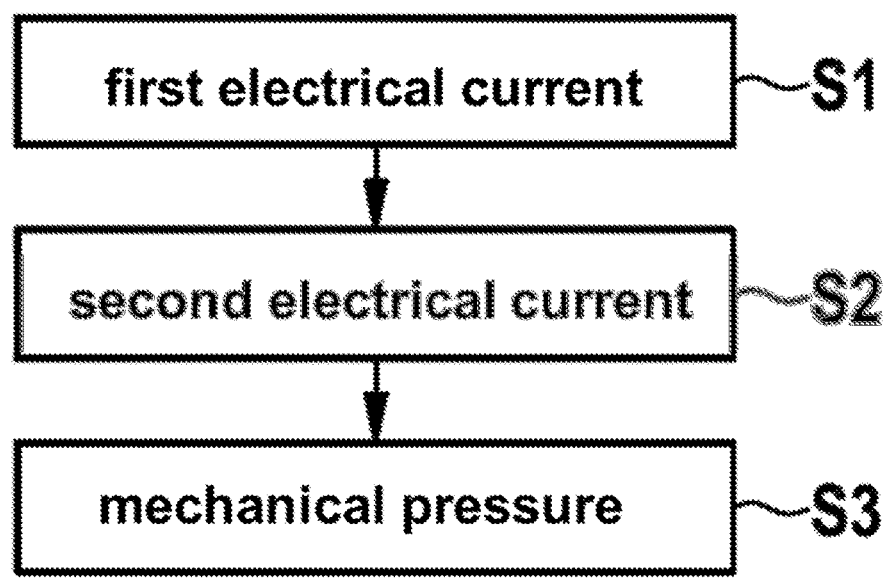
FIG. 4 is a flow diagram of an exemplary method for pre-curing an exemplary adhesive layer according to an exemplary embodiment of the invention.

FIG. 4 is a flow diagram of the method for pre-curing the adhesive layer according to an exemplary embodiment of the invention.

In step S1, the first electrical current may be applied to the first component by means of the pair of electrodes for raising the temperature of the adhesive layer above the activation threshold. In step S2, the second electrical current may be applied to the first component by means of the pair of electrodes for maintaining the temperature of the adhesive layer in a predetermined temperature range that is greater than the activation threshold and less than the degradation temperature of the adhesive layer. In step S3, a mechanical pressure may be applied to the surface of the first component and a surface of the second component for a predetermined time duration during pre-curing the adhesive layer.

Even though the present invention was described with respect to preferred embodiments, it is not limited thereto, but may be modified in numerous ways. Particularly, the invention may be adapted or modified in numerous ways without deviating from the gist of the invention.

The shape of the first and second component may for instance be any desired shape. Furthermore, the pair of electrodes may be placed at any desired position on the surface of the first component. Moreover, the second electrical current may be constant or pulsed, depending on specific requirements. Alternatively, other methods for pre-curing of adhesives such as by induction or infrared heating may be employed.

What is claimed:

1. A method for pre-curing an adhesive layer bonding a first component to a second component before main curing, comprising:
   heating the adhesive layer by treating an adhesive layer component with a pair of electrodes,
   wherein the pair of electrodes applies a predetermined electrical current to the first component, wherein a first electrical current (I1) is applied to the first component with the pair of electrodes for raising a temperature of the adhesive layer above an activation threshold (AT) and thereafter a second electrical current (I2) is applied to the first component with the pair of electrodes for maintaining the temperature of the adhesive layer within a predetermined temperature range (TR) above the activation threshold (AT), wherein the first electrical current (I1) is applied to the first component for a time duration (t1) of about 1000 ms to 7000 ms, wherein the second electrical current (I2) is applied at a predetermined number of pulses, and each of the pulses is applied to the first component for a time duration (t2) of 300 ms to 700 ms, and wherein a mechanical pressure (P) is applied to a surface of the first component and a surface of the second component for a predetermined time duration (t3) during pre-curing of the adhesive layer.

2. The method according to claim 1, wherein the predetermined temperature range (TR) is less than a degradation temperature (DT) of the adhesive layer.

3. The method according to claim 2, wherein the adhesive layer comprises a one-component epoxy, a two-component epoxy, a one-component polyurethane, a two-component polyurethane or a two-component acrylic.

4. The method according to claim 3, wherein, when the adhesive layer comprises the one-component epoxy, the activation threshold (AT) of the adhesive layer is about 180° C., the degradation temperature (DT) of the adhesive layer is greater than about 240° C., and the predetermined temperature range is of about 180° C. to 240° C.

5. The method according to claim 3, wherein, when the adhesive layer comprises the two-component epoxy, the activation threshold (AT) of the adhesive layer is about 120° C., the degradation temperature (DT) of the adhesive layer is greater than about 200° C., and the predetermined temperature range is of about 120° C. to 200° C.

6. The method according to claim 3, wherein when the adhesive layer comprises the one-component polyurethane, the degradation temperature (DT) of the adhesive layer is greater than about 160° C., and the activation threshold (AT) of the adhesive layer is about 100° C., the predetermined temperature range is of about 100° C. to 160° C.

7. The method according to claim 3, wherein, when the adhesive layer comprises the two-component polyurethane, the degradation temperature (DT) of the adhesive layer is greater than about 140° C., and the activation threshold (AT) of the adhesive layer is about 90° C., the predetermined temperature range is of about 90° C. and 140° C.

8. The method according to claim 3, wherein, when the adhesive layer comprises the two-component acrylic, the activation threshold (AT) of the adhesive layer is about 60° C., the degradation temperature (DT) of the adhesive layer is greater than about 120° C., and the predetermined temperature range is of about 60° C. to 120° C.

9. The method according to claim 1, wherein the first electrical current (I1) is of about 500 A to 5500 A.

10. The method according to claim 1, wherein there is a pause of about 1 ms to 2000 ms between applying the first electrical current (I1) and the second electrical current (I2).

11. The method according to claim 1, wherein the second electrical current (I2) is applied at the predetermined number of pulses of about 250 A to 1450 A.

12. The method according to claim 11, wherein, after each of the pulses, there is a pause of about 100 ms to 900 ms and the predetermined number of pulses is 10 to 50 pulses.

* * * * *